(No Model.)
W. SIAR & C. H. DUNN.
BICYCLE SUPPORT.
No. 480,441. Patented Aug. 9, 1892.
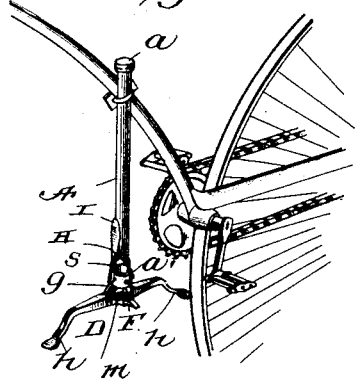
Fig. 1.
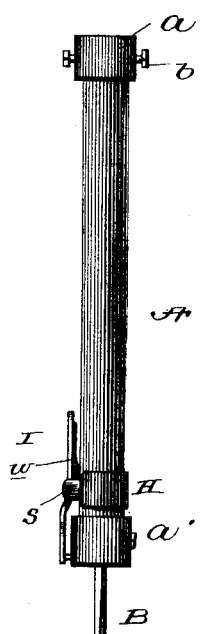
Fig. 2.
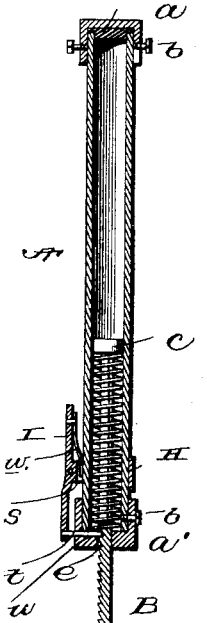
Fig. 3.
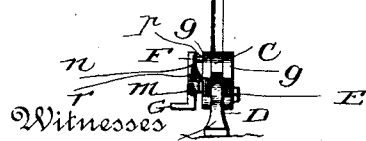
Witnesses
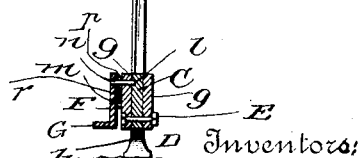
Inventors:
William Siar
Charles H. Dunn
By his Attorney
A. H. Evans & Co.

UNITED STATES PATENT OFFICE.

WILLIAM SIAR AND CHARLES H. DUNN, OF SENECA, PENNSYLVANIA.

BICYCLE-SUPPORT.

SPECIFICATION forming part of Letters Patent No. 480,441, dated August 9, 1892.

Application filed March 17, 1892. Serial No. 425,246. (No model.)

*To all whom it may concern:*

Be it known that we, WILLIAM SIAR and CHARLES H. DUNN, citizens of the United States, residing at Seneca, in the county of Venango and State of Pennsylvania, have invented certain new and useful Improvements in Bicycle Rests or Supports, as set forth in the accompanying drawings, forming part of this specification, in which—

Figure 1 is a side elevation of our improved rest or support, showing the same closed, as when not in use. Fig. 2 is a similar view showing the rest extended and in its operative position. Fig. 3 is a longitudinal sectional view of Fig. 2.

Our invention relates to means permanently attached to bicycles for maintaining them in upright positions when not in use; and it consists of the constructions and combinations of devices forming the improved rest or support, which we shall hereinafter fully describe and claim.

Referring to the accompanying drawings for a more complete explanation of our invention, A represents a tube or socket of suitable length and preferably made of metal, which is securely clipped or otherwise secured to the frame of the bicycle in any suitable manner, having its ends closed by metal caps $a\ a'$, which may be detachably secured either by set-screws $b$ or may screw upon threads cut upon the ends of the tube or socket.

Within the tube or socket A is a stem or rod B, preferably of approximately square shape in cross-section and having a spiral twist throughout its length, as shown, and for a purpose we will hereinafter indicate, said rod having a collar or shoulder $c$ at its upper end adapted to cushion against a rubber or other washer $d$ or spring seated in the upper cap $a$. The lower end of the rod B projects through a square opening $e$ in the lower cap $a'$ and terminates in an enlarged slotted head C, which is fitted between the ears $g$ of a transverse support or step D, having foot portions $h$, forming a broad and secure bearing. The head C of the rod B is pivotally held within the slotted portion of the support or step and between the ears $g$ by means of a bolt E, about which the step has a pivotal movement, whereby its inclination may be varied to correspond with the undulations of the ground, thereby enabling the bicycle to be supported upon uneven or hilly ground.

In the head C, above its point of pivotal connection with the support or step, a series of holes $l$ are formed, and to one side of the step, at or near its slotted center, suitable brackets or lugs $m$ are secured and adapted to receive a lever F, whose lower portion has an outward extension or foot portion G and whose upper end is provided with a pin $n$, which projects through a hole $p$ formed through one of the ears $g$ of the support or step and enters one of the series of holes $l$ in the head C, a spring $r$ being interposed between the lever F and side of the head to keep the pin normally in engagement with its hole $l$ in the head, whereby the step is securely locked to the rod B and is maintained in its locked position.

Surrounding the tube A near the lower cap $a'$ is a clip or split collar H, between whose ear portions $s$ a lever I is pivotally secured and has its lower end provided with an inwardly-extending pin $t$, passing through a hole $u$ in the lower cap $a'$ and adapted to have its inner beveled end serve as a pawl to engage one of a series of ratchet-teeth formed in or on the bar B, whereby when the support or step is pressed or pulled down the rod is extended through the opening in the lower cap $a'$ until one of the ratchet-teeth is engaged by the pin $t$, when the bar is locked to the outer tube and its return movement prevented. To retain the pin $t$ in its engagement with the ratchet-teeth, we employ a spring $w$, which operates against the free end of the lever in the usual manner. This construction enables us to adjust the support to different sizes of wheels and also to the conditions of the ground.

In order that the bar B may be retracted within its tube or socket A and the support or step D raised from its contact with the ground, I locate within the tube, with its ends bearing against the inner wall of the lower cap $a'$ and the collar or shoulder $c$ on the rod, a coiled spring L.

In its operative position the rest or support is secured to the frame of the bicycle in a vertical position just in front of the crank-shaft and with the step D parallel with the frame of the bicycle and the foot portion of the lever F in a position where it may be readily engaged by the foot of the bicyclist. A slight pressure upon this foot portion G of the lever withdraws its pin n from its engagement with the hole l in the head C of the bar B, and this movement continued withdraws the bar, which, because of its spiral form and the square opening in the head a', through which it passes, causes the rod to make a quarter-turn to bring its attached step D to a position at right angles to its former position and also crosswise to the frame of the bicycle. The support or step D being pivotally held to the head of the bar when one of its foot portions h come into contact with the ground, the support or step will turn about its center of movement until both ends of the foot portions rest firmly on the ground, and when the foot is removed from the lever I the pin n is projected by the spring into engagement with one of the holes in the head C and the parts are securely locked and the bicycle firmly supported.

By reason of the adjustability of the support or step D and the fact that the tube A is firmly secured to the frame of the bicycle it is manifest that the bicycle may be supported in a vertical position, even though the ground be hilly or rough, the step automatically adjusting itself to the conditions of the ground and being of a length sufficient to form a broad bearing.

The rider wishing to mount the wheel presses upon the upper free end of the lever I, which, by withdrawing its pin t from engagement with the bar B, releases the parts and enables the spring L to withdraw the bar within the tube and turn the step back into its normal position parallel with the bicycle-frame.

A rest or support similar to the foregoing is simple in its construction, permanently attached to the bicycle, is practically noiseless in its operation, (owing to the cushion in the upper cap,) and is not liable to derangement and excessive wear.

Having thus described our invention, what we claim as new, and desire to secure by Letters Patent, is—

1. In a bicycle-support to be carried on the frame of the bicycle, a bar or rod having a combined rectilinear and rotary movement, whereby it may be extended and moved crosswise of the bicycle-frame, and a step or support pivotally secured to the lower portion of the bar or rod and automatically adjusting itself to the ground, substantially as herein described.

2. A bicycle-support to be carried on the frame of the bicycle and comprising a pivotally-secured support or step forming a broad bearing, and a means by which said support may be turned from a position parallel with the frame to one at right angles thereto.

3. A bicycle-support to be carried on the frame of the bicycle, comprising a detachable tube or socket to be secured to said frame, an extensible bar within said tube or socket, a support or step pivotally secured to said bar, whereby it automatically adjusts itself to the condition of the ground, and means for converting the rectilinear movement of the bar into a rotary movement, whereby the support or step may lie parallel with the frame of the bicycle or at right angles thereto.

4. A bicycle-support comprising an extensible bar which has a combined rectilinear and rotary movement, a holder for the bar, and a pivotally-secured support or step carried by the bar and automatically adjusting itself to the condition of the ground.

5. A bicycle-support comprising a tube or socket to be fitted to the frame of the bicycle and having a square opening in one end, a spirally twisted or turned bar within said tube and projecting through said opening, a support or rest pivotally secured to the projected end of the bar and having a movement about its pivot to conform to the condition of the ground, a means for locking the support or step after its adjustment, a spring-actuated pawl for holding the bar extended, and a spring for returning the bar when the pawl is released, substantially as herein described.

6. A bicycle-support comprising a tube or socket to be fitted to the frame of the bicycle and having end caps, one of which has a square opening, a rod or bar mounted within the tube with its lower end projecting through said opening, said rod having a square form in cross-section and having a spiral twist imparted to it, a ratchet on the bar, and a spring-actuated pawl on the tube passing through a hole therein and engaging and holding the bar when the latter is extended, an enlarged head on the lower end of the bar having a series of holes, a support or step pivotally secured to said head, whereby it may adjust itself to the condition of the ground, a pivoted spring-actuated lever on the support, having a pin passing through a hole in the support and entering one of the holes in the head of the bar to lock the support in its adjusted position, said lever having a foot portion by which it is operated to project the bar and disengage the pin from the head, and a spring for returning the bar and support to their normal positions.

7. A bicycle-support comprising a bar having a combined rectilinear and rotary movement, a holder therefor, a support or step pivotally secured to said bar, and a means for locking the support or step to the head, consisting of a pivoted lever having one end engaging the head and its opposite end forming a foot-piece, whereby the bar is extended and support unlocked from the head simultaneously, and a means for returning the bar within the holder, substantially as herein described.

WM. SIAR.
CHAS. H. DUNN.

Witnesses:
W. H. BORLAND,
W. T. TURNER.